(12) United States Patent
Abiko et al.

(10) Patent No.: US 6,551,681 B2
(45) Date of Patent: Apr. 22, 2003

(54) OPTICAL RECORDING MEDIUM

(75) Inventors: Toru Abiko, Miyagi (JP); Fuminori Takase, Miyagi (JP); Hitoshi Shimomuki, Miyagi (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 09/832,604

(22) Filed: Apr. 11, 2001

(65) Prior Publication Data

US 2002/0018869 A1 Feb. 14, 2002

(30) Foreign Application Priority Data

Apr. 12, 2000 (JP) ..................................... P2000-110810
Sep. 28, 2000 (JP) ..................................... P2000-296189

(51) Int. Cl.$^7$ ................................................ B32B 3/02
(52) U.S. Cl. .................... 428/64.1; 428/64.5; 428/64.6; 430/270.13
(58) Field of Search .............................. 428/64.1, 64.4, 428/64.5, 64.6, 45.7, 913; 430/270.13, 495.1, 945; 309/275.1, 283, 288

(56) References Cited

U.S. PATENT DOCUMENTS 6,228,457 B1 * 5/2001 Ueno ......................... 428/64.1

2001/0015949 A1 * 8/2001 Nagase ....................... 369/100

* cited by examiner

Primary Examiner—Elizabeth Mulvaney
(74) Attorney, Agent, or Firm—Sonnenschein, Nath & Rosenthal

(57) ABSTRACT

In order to increase the recording capacity while preventing jitter deterioration and a decrease of the modulation factor and thereby ensuring satisfactory recording characteristics, a first dielectric film, phase recording film, second dielectric film, reflection film and protective film are sequentially formed on a disc substrate having formed lands, grooves and wobbling on one major surface. The recording film is made of a GeInSbTe alloy, and the reflection film is made of an AgPdCu alloy or AlCu alloy. Composition of the GeInSbTe alloy is adjusted to contain Ge in the range of 1 to 8 wt %, In in the range of 2 to 6 wt %, and control Sb/Te in the range of 2.2 to 3.0. Composition of the AgPdCu alloy is adjusted to contain Pd in the range of 0.9 to 1.5 wt % and Cu not more than 1.5 wt %. Composition of the AlCu alloy is adjusted to contain Cu in the not more than 1.5 wt %. Groove depth is controlled in the range of 35 to 45 nm, groove width in the range of 0.35 to 0.50 μm, thickness of the first dielectric film in the range of 75 to 95 nm, thickness of the recording film in the range of 12 to 20 nm, thickness of the second dielectric film in the range of 16 to 28 nm, and thickness of the reflection film in the range of 80 to 160 nm.

12 Claims, 5 Drawing Sheets

OPTICAL RECORDING MEDIUM

RELATED APPLICATION DATA

The present application claims priority to Japanese Applications Nos. P2000-110810 filed Apr. 12, 2000, and P2000-296189 filed Sep. 28, 2000, which applications are incorporated herein by reference to the extent permitted by law.

BACKGROUND OF THE INVENTION

This invention relates to an optical recording medium, especially suitable for application to a phase change-versatile optical disc available for repetitive recording and erasure.

In recent data recording technologies, researches are being developed regarding optical recording systems. Optical recording systems can record and reproduce information signals without contacting a recording medium, and can attain higher recording densities as ten times or more as that those of magnetic recording systems. Additionally, optical recording systems have a number of advantages, including the availability for use with any type of memory such as reproduction-exclusive type, additional recording type and rewritable type. Thus, the optical recording systems are expected to be widely usable in industrial purposes and home-base purposes as a recording system that enables realization of inexpensive, large-capacity files.

Among those optical recording systems, optical magnetic discs and phase-versatile optical discs, for example, cope with rewritable memory modes.

Among them, a magneto-optical disc is configured such that its recording film made of a magnetic material is heated to or above a Curie point or a temperature compensation point to decrease the coercive force of the recording film, then an external recording magnetic field is applied to change the magnetic orientation of the recording film, and information signals are recorded, or magnetically read out. On the other hand, a phase change-versatile optical disc includes a recording film made of a phase change-versatile material in which a phase change between a crystalline state and an amorphous state reversibly occurs, and is configured such that its recording film is heated by irradiation of laser light, for example, to cause a change in phase in the recording film, thereby to record/erase information signals, or optically read out information signals.

As a conventional phase disc, CD-RW (compact disc-rewritable) is known and being spread. The format of CD-RW is shown below.

Medium
Recording bit length: 0.59 $\mu$m per bit
Capacity: 640 MB (ISO9660)
Track pitch: 1.6 $\mu$m
Upon Recording
Wavelength ($\lambda$) or irradiated laser light: $\lambda$=780 nm
Numerical aperture of the optical system (NA): NA=0.50
Linear velocity: 1.2~4.8 m/s (equal velocity to four-times velocity)
Repeatable recording frequency: 1000 times or more
Upon Reproduction
Wavelength ($\lambda$) or irradiated laser light: $\lambda$=780 nm
Numerical aperture of the optical system (NA): NA=0.45
Reflectance: 15~25%
Modulation factor: 55~70%
Resolution: 45~60%

In order to realize such a phase optical disc under that regulation (specifically, CD-RW), AgInSbTe alloy series materials are used as phase materials, and Al—Ti alloys and Al—Cr alloys are used as materials of reflection films.

However, regarding such phase optical discs, further improvements in recording speed and reproducing speed are demanded, and at the same time, a larger recording capacity is desired. If an improvement of the linear velocity is tried toward realization of high-speed recording and high-speed reproduction among those requirements, the following problem will occur. That is, recording or reproduction of information signals at a higher linear velocity than the conventional maximum linear velocity (about 4.8 m/s (four-times velocity) in linear velocity) will invite a deterioration of jitters and decrease of the modulation factor. Therefore, practically acceptable recording characteristics could not be obtained.

Additionally, according to the knowledge of the Inventor, even if it is tried to reduce the track pitch or increase NA, for example, for the purpose of increasing the recording capacity than that of the conventional optical recording mediums, it is very difficult to obtain satisfactory recording/reproduction characteristics in the high linear velocity range. Therefore, it has been demanded to develop a technique capable of increasing the capacity while ensuring satisfactory recording/reproduction characteristics even in the high linear velocity range.

SUMMARY AND OBJECT OF THE INVENTION

It is therefore an object of the invention to provide an optical recording medium that can ensure practically satisfactory recording characteristics even under the high linear velocity range and can be increased in recording capacity to realize a large-capacity recording medium.

According to the first aspect of the invention, there is provided an optical recording medium having a substrate defining a corrugated and uneven groove track configuration on one major surface thereof; and a first dielectric film, a phase recording film, a second dielectric film and a reflection film which are sequentially stacked on the major surface of the substrate, characterized in:

the phase recording film being made of a GeInSbTe alloy material, and the reflection film being made of an AgPdCu alloy material;

in the GeInSbTe alloy material forming the phase recording film, content of Ge being in the range from 1 weight % to 8 weight %, content of In being in the range from 2 weight % to 6 weight %, and ratio of Sb relative to Te being in the range of 2.2 times to 3.0 times, and in the AgPdCu alloy material forming the reflection film, content of Pd being in the range of 0.9 weight % to 1.5 weight %, and content of Cu being in the range of 0.9 weight % to 1.1 weight %, depth of each depression in the groove track configuration being in the range from 35 nm to 44 nm, distance between two adjacent boundaries at opposite sides of the depression among boundaries between crests and depressions being in the range of 0.35 $\mu$m to 0.50 $\mu$m, thickness of the first dielectric film being in the range of 75 nm to 95 nm, thickness of the phase recording film being in the range of 12 nm to 20 nm, thickness of the second dielectric film being in the range of 16 nm to 28 nm, and thickness of the reflection film being in the range of 80 nm to 160 nm.

According to the second aspect of the invention, there is provided an optical recording medium having a substrate defining a corrugated and uneven groove track configuration on one major surface thereof; and a first dielectric film, a phase recording film, a second dielectric film and a reflection film which are sequentially stacked on the major surface of the substrate, characterized in:

the phase recording film being made of a GeInSbTe alloy material, and the reflection film being made of an AlCu alloy material;

in the GeInSbTe alloy material forming the phase recording film, content of Ge being in the range from 1 weight % to 8 weight %, content of In being in the range from 2 weight % to 6 weight %, and ratio of Sb relative to Te being in the range of 2.2 times to 3.0 times, and in the AlCu alloy material forming the reflection film, content of Cu being not larger than 1.5 weight %, depth of each depression in the groove track configuration being in the range from 35 nm to 44 nm, distance between two adjacent boundaries at opposite sides of the depression among boundaries between crests and depressions being in the range of 0.35 $\mu$m to 0.50 $\mu$m, thickness of the first dielectric film being in the range of 75 nm to 95 nm, thickness of the phase recording film being in the range of 12 nm to 20 nm, thickness of the second dielectric film being in the range of 16 nm to 28 nm, and thickness of the reflection film being in the range of 80 nm to 160 nm.

In the present invention, width of the interval between two adjacent boundaries interposing a recess therebetween is preferably in the range from 0.40 $\mu$m to 0.50 $\mu$m.

In the present invention, ratio of Sb relative to Te is preferably in the range from 2.2 times to 2.8 times.

In the present invention, the optical recording medium is typically available for recording and/or erasing information signals by irradiating at least the phase recording film with light having a wavelength in the range from 775 nm to 795 nm, more specifically around 780 nm.

In the present invention, numerical aperture of the lens in the optical system used upon recording and/or erasing information signals on or from the optical recording medium is typically in the range from 0.54 to 0.56, and more specifically, approximately 0.55.

In the present invention, the recording linear density in the optical recording medium is typically about 0.44 $\mu$m per bit.

In the present invention, the first dielectric film is made of a material with a low absorptance to laser light of the optical system used upon recording/reproduction to the optical recording medium. Preferably, a material having a value of extinction coefficient k not higher than 0.3 (k$\leq$0.3) is used as the material of the first dielectric film.

In the present invention, the second dielectric film is made of a material with a low absorptance to laser light of the optical system used upon recording/reproduction of the optical recording medium. Preferably, a material having a value of extinction coefficient k not higher than 0.3 (k$\leq$0.3) is used as the material of the first dielectric film.

In the present invention, the optical recording medium is a rewritable optical recording medium using a phase material as the recording film. Additionally, the track pitch in the uneven groove track configuration in the optical recording medium according to the invention is about 1.1 $\mu$m, for example. The optical recording medium according to the invention may be CD-RW (compact disc-rewritable) having a recording capacity around 1.3 GB.

According to the optical recording medium having the above-summarized configuration according to the invention, the phase recording film in the optical recording medium is made of a GeInSbTe alloy material; the reflection film is made of an AgPdCu alloy material or AlCu alloy material; the GeInSbTe alloy material forming the phase recording film contains Ge in the range from 1 weight % to 8 weight %, In in the range from 2 weight % to 6 weight %, and Sb in the range from 2.2 times to 3.0 times of Te; the reflection film, when made of an AgPdCu alloy material, contains Pd in the range from 0.9 weight % to 1.5 weight % and Cu in the range from 0.9 weight % to 1.1 weight %; the reflection film, when made of an AlCu alloy material, contains Cu by 1.5 weight %; depth of each recess in the uneven groove track configuration along the major surface of the substrate is in the range from 35 nm to 45 nm; distance between two boundaries, among boundaries between lands and grooves of the groove tracks, is in the range from 0.35 $\mu$m to 0.50 $\mu$m; thickness of the first dielectric film is in the range from 75 nm to 95 nm; thickness of the phase recording film is in the range from 12 nm to 20 nm; thickness of the second dielectric film is in the range from 16 nm to 28 nm, and thickness of the reflection film is in the range from 80 nm to 160 nm. This configuration can prevent deterioration of jitters and a decrease of the modulation factor even when the linear velocity is increased upon recording and/or erasing information signals, and thereby ensures satisfactory recording characteristics in the optical recording medium.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
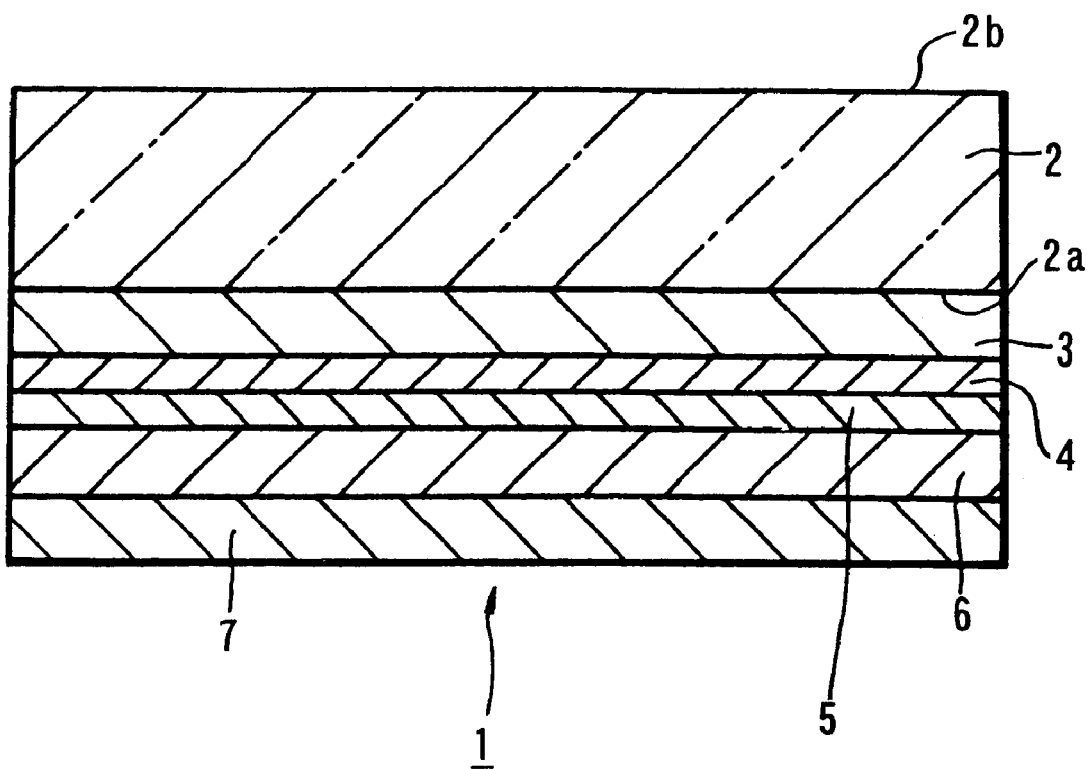
FIG. 1 is a cross-sectional view that shows an optical disc according to the first embodiment of the invention.

Embodiments of the invention will now be explained below with reference to the drawings. In all figures illustrating the embodiments, common and equivalent components are labeled with common reference numerals.

First explained is an optical recording medium according to the first embodiment of the invention. FIG. 1 shows the optical recording medium according to the first embodiment.

As shown in FIG. 1, the optical recording medium according to the first embodiment is a phase disc-shaped optical recording medium (hereinafter called optical disc). The optical disc 1 is made up of a first dielectric film 3, phase recording film 4, second dielectric film 5, reflection film 6 and protective film 7 that are sequentially stacked on a major surface 2a of the disc substrate 2.

Figure 2:
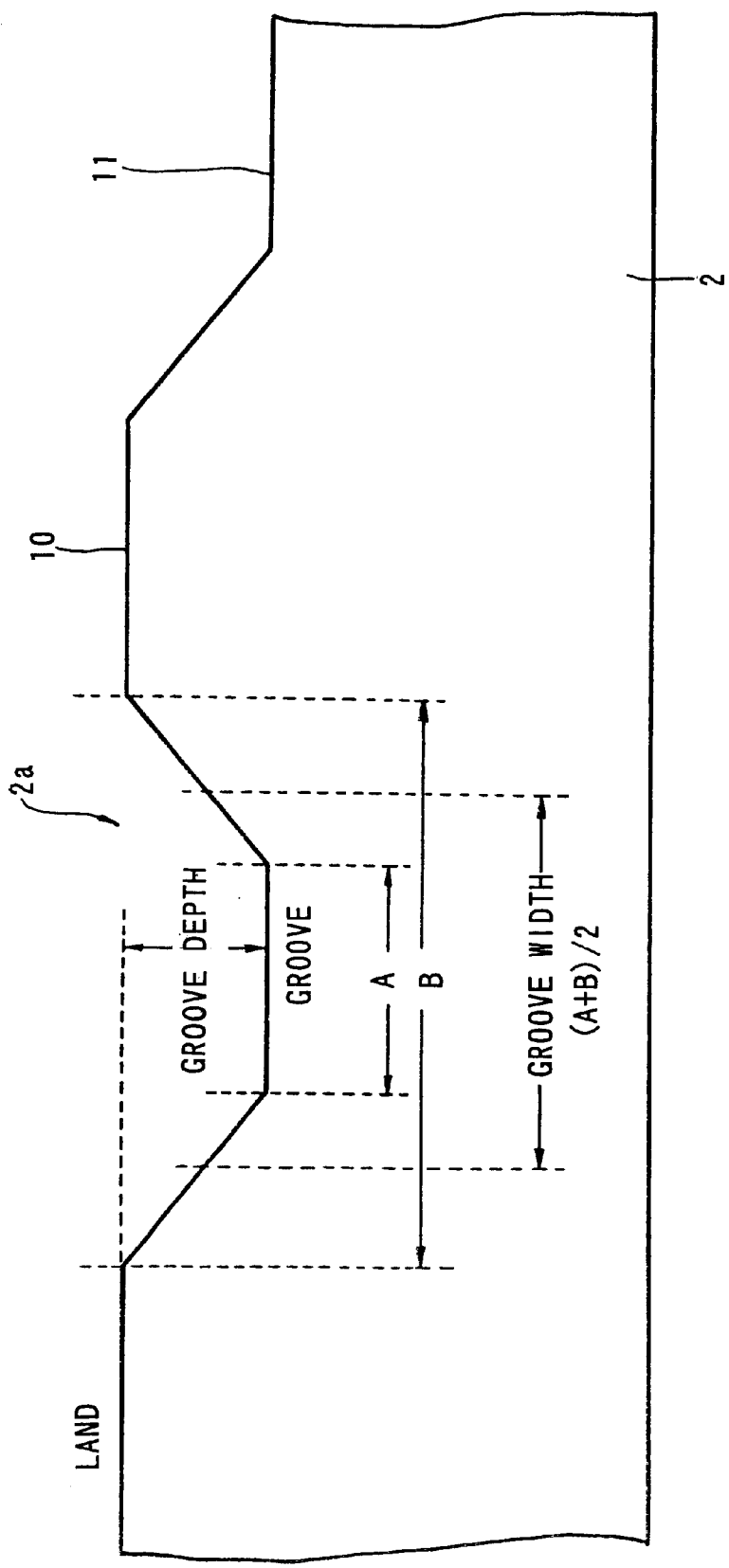
FIG. 2 is a cross-sectional view of a disc substrate for explaining width and depth of a groove according to the first embodiment of the invention.

The disc substrate 2 is made of a plastic material such as polycarbonate resin, polyolefin resin, acrylic resin, or the like, or glass. Material of thedisc substrate is selected from those that can pass at least laser light used for recording and reproducing information signals, and from the viewpoint of its cost, a plastic material is preferably used. The disc substrate 2 may be disc-shaped, and its exemplary size has a thickness around 1.2 mm and a diameter of 12 cm, for example. In the embodiment shown here, the major surface 2a of the disc substrate 2 has formed groove tracks as shown in FIG. 2 in which convex portions (lands) 10 and concave (grooves) 11 are alternately arranged in form of tracks. The track pitch is about 1.1 $\mu$m, for example. Depth and width of the groove are selected adequately, taking it into consideration that they largely affect push-pull (PP) signals, as servo signals, and radial contrast signals. Specifically, groove depth is selected from the range of 35 to 45 mm, and the groove width is selected from the range of 0.35 to 0.50 $\mu$m. With these of values of the groove depth and groove width, satisfactory push-pull magnitude and RC as the drive servo power can be obtained. The above-indicated groove width is defined by the width between two boundaries that are adjacent at opposite sides of a groove among boundaries of convex portions (lands 10) and concave (grooves 11). Specifically, the width from the midpoint on the bank between a land 10 and a groove 11 to the midpoint on the opposed bank between the adjacent land 10 and the same groove 11, that is, the value (A+B)/2 calculated from the width A of the bottom of the groove and the distance B between adjacent two lands, is defined as the groove width. Conditions of the groove depth and groove width will be explained later in greater detail.

The groove tracks as shown in FIG. 2 have formed corrugated wobbling (not shown) for reading an address upon recording/reproducing information. Wobbling amplitude of the wobbling at the 0-peak is chosen from the viewpoint of obtaining a sufficient wobble signal and preventing deterioration of the recording signal characteristics. That is, if the wobbling amplitude is determined to be smaller than 25 nm, sufficient wobble signal will not be obtained. If the wobbling amplitude is determined to be larger than 35 nm, it will cause deterioration of recording signal characteristics in optical discs having the track pitch of 1.1 $\mu$m. Therefore, the wobbling amplitude of the disc substrate 2 according to the first embodiment is chosen from the range of 25 to 35 nm. Details about conditions of the wobbling amplitude will be explained later.

Materials of the first dielectric film 3 and the second dielectric film 5 are those having a low absorptance to laser light for recording and reproduction, preferably those having an extinction coefficient not larger than 0.3. Taking heat resistance into consideration, a mixture of zinc sulfide (ZnS) and silicon oxide ($SiO_2$) (especially having a molar ratio around 4:1), for example, is recommended as the material of the first dielectric film 3 and the second dielectric film 5. These first dielectric film 3 and second dielectric film 5 may be made of different ones of such materials.

Thickness of the first dielectric film 3 is determined from viewpoints of its reflectance and modulation factor. That is, if thickness of the first dielectric film 3 is out of the range from 75 nm to 95 nm, its reflectance will increase, and the modulation factor will decrease. Therefore, it is determined in the range from 75 to 95 nm, and in the first embodiment, it is 85 nm, for example. Details about conditions of thickness of the first dielectric film 3 will be explained later.

Regarding the second dielectric film 5, if its thickness is smaller than 16 nm, the phase recording film 4 will be cooled rapidly, and sufficient modulation characteristics will not be obtained. On the other hand, if thickness of the second dielectric film 5 is thicker than 28 nm, its jitter characteristics will deteriorate, and desired property will not be obtained. Therefore, thickness of the second dielectric film 5 is preferably in the range from 16 nm to 28 nm. In the first embodiment, it is 22 nm, for example. Details about condition of the thickness of the second dielectric film 5 will be explained later.

The phase film 4 is made of a GeInSbTe alloy, for example. Among compositions of the GeInSbTe alloy forming the phase recording film 4, first regarding the content of Ge, if it is less than 1 weight %, storage stability will decrease. If its amount is more than 8 weight %, signal characteristics, especially the jitter characteristics, will decrease. Regarding the content of In, if it is less than 2 weight %, the phase recording film 4 will be difficult to crystallize. If it is more than 6 weight %, reproduction stability will decrease, such as undesirable disappearance of recorded marks. Regarding the ratio of Sb relative to Te, if the value of Sb/Te is smaller than 2.2, signal characteristics will deteriorate in high linear velocity ranges. If it is larger than 3.0, signal characteristics will deteriorate in low linear velocity ranges. Therefore, in the GeInSbTe alloy forming the phase recording film 4, content of Ge is controlled in the range of 1 to 8 weight %, content of In is controlled in the range of 2 to 6 weight %, and Sb-to-Te ratio (Sb/Te) is controlled in the range of 2.2 through 3.0. In summary of these contents, when the composition of the phase recording film 4 is $Ge_pIn_qSb_rTe_s$, composition ratios p, q, r and s (weight %) simultaneously satisfy the relations of $1 \leq p \leq 6$, $2 \leq q \leq 6$ and $2.2 \leq r/s \leq 3.0$. Details about composition conditions of materials forming the phase recording film 4 will be explained later.

If the phase recording film 4 is thinner than 12 nm, it will be difficult to obtain a satisfactory reflectance, and at the same time, repetitive recording characteristics will decrease. If its thickness is larger than 20 nm, modulation will seriously decrease too small to obtain desired characteristics. Therefore, thickness of the phase recording film 4 is controlled in the range from 12 through 20 nm. In the first embodiment, it is 16 nm, for example.

The reflection film 6 is made of an Ag alloy, for example. In the first embodiment, it may be made of an AgPdCu alloy. In the AgPdCu alloy forming the reflection film 6, first regarding the content of Pd, if it is lower than 0.9 weight % or higher than 1.5 weight %, resistance to corrosion will deteriorate. Also regarding the content of Cu, if it is less than 0.9 weight % or more than 1.1 weight %, resistance to corrosion will decrease. Therefore, in the AgPdCu alloy forming the reflection film 6 in the first embodiment, content of Pd is controlled in the range from 0.9 to 1.5 weight %, and content of Cu is controlled in the range of 0.9 to 1.1 weight %. Details about composition conditions of materials forming the reflection film 6 will be explained later.

As to the reflection film 6, if its thickness is thinner than 80 nm, heat generated in the phase recording film 4 will not be able to diffuse sufficiently, and insufficient cooling will deteriorate the jitter characteristics. On the other hand, if the reflection film 6 is thicker than 160 nm, although thermal characteristics and optical characteristics remain intact, mechanical characteristics, such as skew, are adversely affected, and desired characteristics are not obtained. Therefore, thickness of the reflection film 6 is chosen from the range of 80 to 160 nm, and in the first embodiment, it may be 120 nm, for example.

The protective film 7 is made of an ultraviolet-setting resin, for example.

Figure 4:
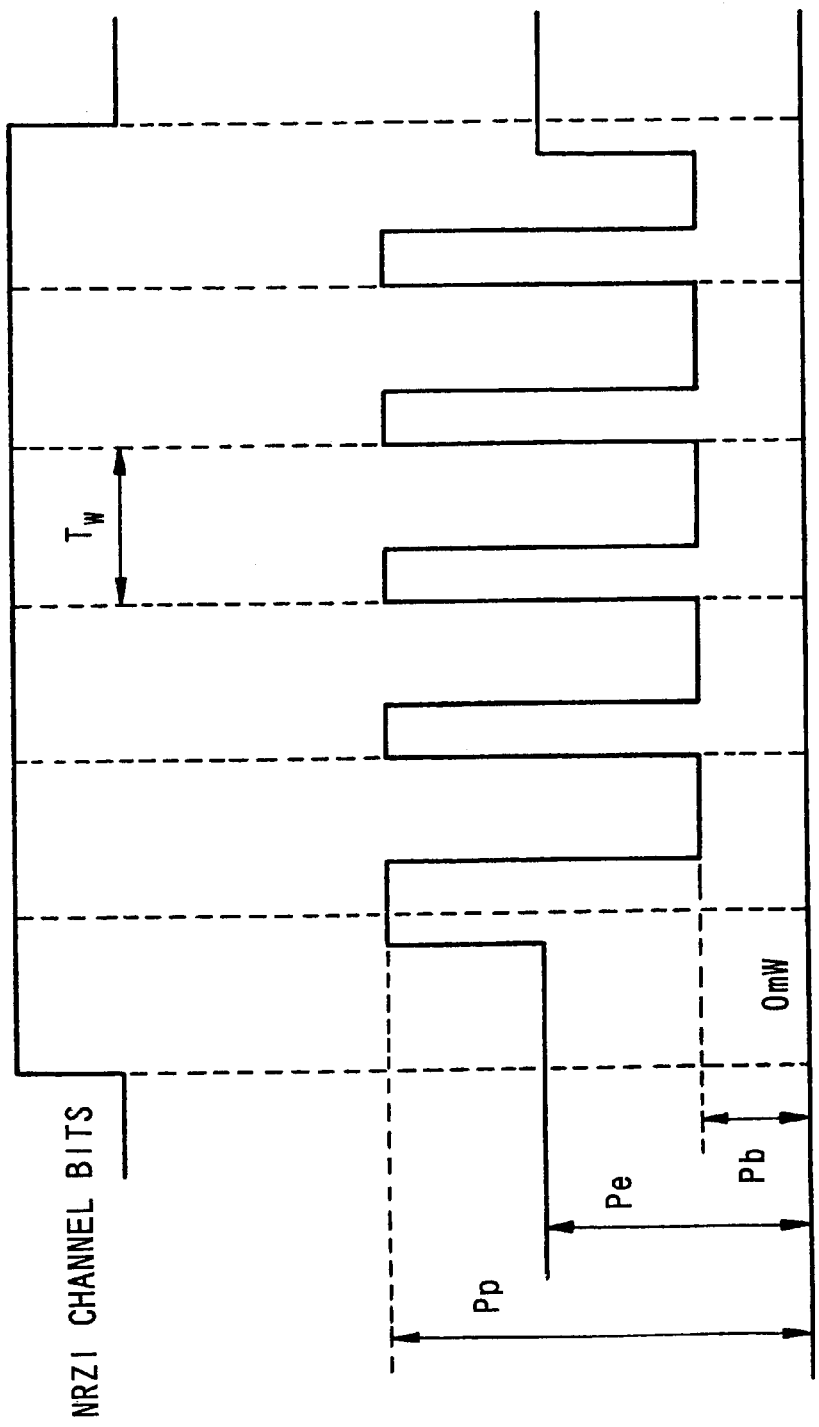
FIG. 4 is a graph that shows a recording light emission pattern used upon evaluating jitter characteristics of the optical disc according to the first embodiment of the invention.

For recording information signals on the optical disc 1 according to the first embodiment having the above-explained structure, recording light such as laser light having a wavelength around 780 nm, for example, is locally irradiated from the other major surface 2b opposite from the major surface 2a of the disc substrate 2 to change a part of the phase recording film 4 to a crystalline phase or amorphous phase. The phase material made of a GeInSbTe alloy according to the first embodiment changes to an amorphous state when heated or cooled rapidly, and changes to a crystalline state when cooled gradually, for example, although depending upon the heating temperature. In this way, by making crystal portions and non-crystal portions in the phase recording film 4 in response to information signals, recording of the information signal is carried out. Recording bit length of the optical disc 1 according to the first embodiment is around 0.44 μm per bit, for example. Wavelength of the laser light used upon recording is about 780 nm, and numerical aperture NA is about 0.55. For recording in the first embodiment, the recording waveform shown in FIG. 4 is used.

For reproducing information signals recorded on the optical disc 1, reproduction light such as laser light is irradiated toward the phase recording film 4 from the side of the other major surface 2b opposite from the major surface 2a of the disc substrate 2, thereby to carry out reproduction of information signals corresponding to the crystal phase and the amorphous phase by using a difference in reflectance between different crystal phases or amorphous phases in the phase recording film 4. Used as the reproduction light is laser light not to cause a phase change in the phase recording film 4.

Next explained is a manufacturing method of the optical recording medium according to the first embodiment, namely, the optical disc 1.

In the optical disc manufacturing method according to the first embodiment, first prepared is the disc substrate 2 having a thickness around 1.2 mm and made of a material permitting at least laser light to pass through, such as polycarbonate resin, polyolefin resin, acrylic resin or glass. Thereafter, the tracking groove 11 is made in a spiral form.

After that, on the surface of the disc substrate 2 having formed the groove 11 (major surface 2a), ZnS—SiO$_2$ mixture, for example, is stacked by sputtering, for example, to form the first dielectric film 3 of ZnS—SiO$_2$.

Thereafter, a GeInSbTe alloy is stacked as a phase material on the first dielectric film 3 by sputtering, for example, to form the phase recording film 4. At that time, in the step of making the phase recording film by sputtering, a Ge$_p$In$_q$Sb$_r$Te$_s$ material is used as a target, in which composition ratios p, q, r and s (weight %) satisfy the relations of $1 \leq p \leq 8$, $2 \leq q \leq 6$ and $2.2 \leq r/s \leq 3.0$. As this sputtering, simultaneous sputtering may be employed, which uses a target of Ge, target of In, target of Sb and target of Te, or alternatively, vacuum evaporation is also usable. By controlling compositions of those sputtering targets, phase-changing speed of the phase recording film 4 can be increased, and the recording characteristics of the optical disc 1 at high linear velocities can be enhanced.

After that, ZnS—SiO$_2$, for example, is stacked on the second dielectric film 4 by sputtering, for example, to form the second dielectric film 5.

Subsequently, the AgPdCu alloy is stacked on the second dielectric film 5 by sputtering, for example, to form the reflection film 6 of the AgPdCu alloy. In the step of forming the reflection film 6 by sputtering, an AgPdCu alloy is used as a target, and composition ratios m and n (weight %) in the Ag$_1$Pd$_m$Cu$_n$ material are controlled to satisfy the relations of $0.9 \leq m \leq 1.5$ and $0.9 \leq n \leq 1.1$. As this sputtering, simultaneous sputtering may be employed by using a target of Ag, target of Pd and target of Cu simultaneously, or alternatively, vacuum evaporation is also usable.

Finally coated is an ultraviolet-setting resin, for example, on the reflection film 6 by spin coating, for example. As a result, the protective film 7 for protecting films of the disc substrate 2 is formed on the reflection film 6.

In this way, the optical disc 1 according to the first embodiment is obtained.

Experiments were carried out concerning optical discs according to the first embodiment, together with experiments with optical discs of conditions out of those according to the first embodiment.

First made is the first experiment regarding relations of groove conditions including groove depth, groove width and wobbling amplitude with NWS (normalized wobble signal), PP (push-pull magnitude) and RC (radial contrast).

That is, in the first experiment, disc substrates different in groove condition were prepared, and a first dielectric film, phase recording film, second dielectric film and reflection film were sequentially stacked in the same manufacturing process as that of the first embodiment on one major surface of each disc substrate having formed grooves. Then, after initialization or formatting, NWS, PP and RC were measured. At the same time, recording was carried out under optimized recording strategy and recording power, and RC after recording was measured. Wavelength of the laser light in a measurement/evaluation apparatus used for the first experiment was 780 nm, and NA was 0.55. Recording density of the optical disc was 0.44 μm per bit.

Results of the first experiment are shown in Table 1 below. Ranges of numerical values indicated under the items, NWS, PP and RC, are their standard ranges. In the item of RC, standard values before and after recording are shown together. When each evaluation result about NWS, PP and RC is in the standard range, "○" is indicated, and if it is out of the standard range, "X" is indicated.

TABLE 1

| Groove depth (nm) | Groove width (μm) | Wobbling amplitude (nm) | NWS 0.035–0.07 | PP 0.12–0.18 | RC before >0.05 after 0.30–0.6 |
|---|---|---|---|---|---|
| 40 | 0.30 | 30 | ○ | X | X |
| 40 | 0.35 | 30 | ○ | ○ | ○ |
| 40 | 0.50 | 30 | ○ | ○ | ○ |
| 30 | 0.40 | 30 | ○ | X | ○ |
| 35 | 0.40 | 30 | ○ | ○ | ○ |
| 40 | 0.40 | 30 | ○ | ○ | ○ |
| 45 | 0.40 | 30 | ○ | ○ | ○ |
| 50 | 0.40 | 30 | ○ | X | X |
| 40 | 0.50 | 20 | X | ○ | ○ |
| 40 | 0.50 | 25 | ○ | ○ | ○ |
| 40 | 0.50 | 35 | ○ | ○ | ○ |

As apparent from Table 1, when the groove width is optimized to 0.40 μm, and the groove depth is changed variously in the range from 30 to 50 nm, PP comes out of the standard range when the groove depth is 30 nm, and PP and RC before and after recording come out of the standard ranges when the groove depth is 50 nm or more. When the groove depth is 35 nm, 40 nm and 45 nm (35 to 45 nm), all of NWS, PP and RC before and after recording come within the standard ranges. Therefore, groove depth should be selected from the range larger than 30 nm and smaller than 50 nm, and more preferably from the range of 35 to 45 nm.

Still referring to Table 1, also when the groove depth is optimized to 40 nm, and the groove width is changed variously in the range of 0.30 to 0.50 µm, PP and RC before and after recording come out of the standard ranges when the groove width is 0.3 µm, below 0.35 nm. When the groove depth is optimized to 40 nm, and the groove width is in the range from 0.35 to 0.50 µm, all of NWS, PP and RC before and after recording come within the standard ranges. Desirably, therefore, groove width is in the range from 0.30 µm to 0.50 µm, and it is preferably chosen in the range from 0.35 to 0.50 µm. More preferably, it is chosen in the range from 0.40 to 0.50 µm.

Still referring to Table 1, when the groove depth and the groove width are optimized to 40 nm and 0.5 µm, respectively, and wobbling amplitude is changed variously in the range of 20 to 35 nm, NWS comes out of the standard range when the wobbling amplitude becomes 20 nm below 25 nm. When the wobbling amplitude is 25 nm, 30 nm and 35 nm, all of NWS, PP and RC before and after recording come within the standard ranges. Therefore, wobbling amplitude is desirably selected from the range larger than 20 nm and preferably from the range of 25 to 35 nm.

Next made was the second experiment regarding dependencies of signal characteristics of optical discs upon film thickness of the first dielectric film, phase recording film, second dielectric film and reflection film.

That is, in the second experiment, the first dielectric film, phase recording film, second dielectric film and reflection film were formed on each disc substrate, variously changing these films in thickness to obtain optical discs. After that, recording characteristics of these various optical discs were evaluated. The measurement/evaluation apparatus and recording densities of optical discs used in the second experiment were the same as those of the first experiment, and the recording strategy and the recording power were optimized.

Figure 3:
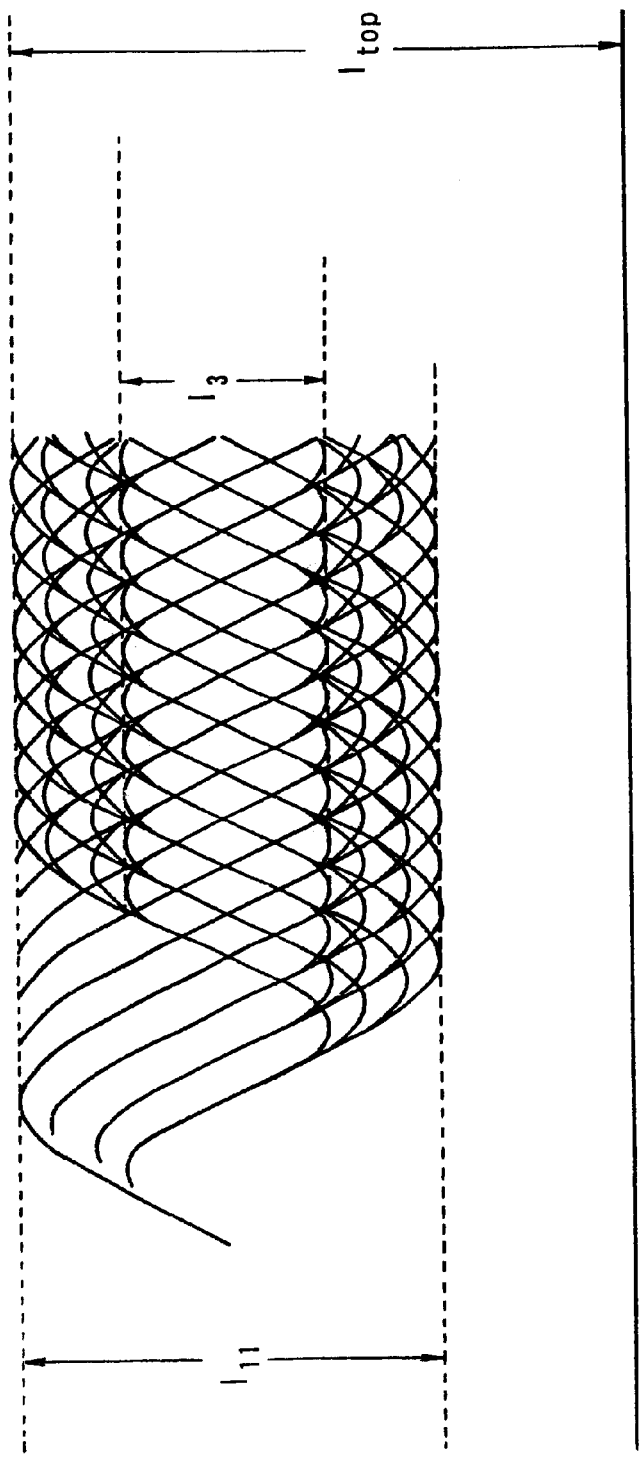
FIG. 3 is a graph for explaining definitions of characteristics regarding reflectance evaluated in the first embodiment of the invention.

Results of the second experiment are shown in Table 2 below. In the second experiment, $I_{top}$ (higher reflectance level of a 11T signal recorded in the groove. See FIG. 3) Modulation ($I_{11}/I_{top}$. See FIG. 3), resolution ($I_3/I_{top}$ See FIG. 3), asymmetry ((center of $I_3$—center of $I_{11}$)/$I_{11}$. See FIG. 3), and 3T jitter were measured while variously changing the films forming optical discs in thickness. Ranges of numerical values indicated under the items are their standard ranges. That is, the range of 15 to 25% for $I_{top}$, range not smaller than 55% for modulation, range not smaller than 20% for resolution, range from −15 to 5% for asymmetry, and range not larger than 15% for 3% jitter are the standard ranges. When each evaluation result of $I_{top}$, modulation, resolution, asymmetry and 3T jitter falls within the standard range, "○" is indicated, and if it is out of the standard range, "X" is indicated.

TABLE 2

| 1st dielectric film | Phase change-versatile recording film | 2nd dielectric film | Reflective film | $I_{top}$ 0.15~0.25 | Modulation >0.55 | Resolution >0.2 | Asymmetry −0.15~−0.05 | 3T Jitter <15% |
|---|---|---|---|---|---|---|---|---|
| 65 | 16 | 24 | 120 | X | ○ | ○ | ○ | ○ |
| 75 | 16 | 24 | 120 | ○ | ○ | ○ | ○ | ○ |
| 95 | 16 | 24 | 120 | ○ | ○ | ○ | ○ | ○ |
| 105 | 16 | 24 | 120 | ○ | X | ○ | ○ | X |
| 80 | 10 | 24 | 120 | X | X | ○ | X | X |
| 80 | 12 | 24 | 120 | ○ | ○ | ○ | ○ | ○ |
| 80 | 20 | 24 | 120 | ○ | ○ | ○ | ○ | ○ |
| 80 | 22 | 24 | 120 | ○ | ○ | ○ | ○ | X |
| 85 | 16 | 14 | 120 | ○ | X | ○ | ○ | ○ |
| 85 | 16 | 16 | 120 | ○ | ○ | ○ | ○ | ○ |
| 85 | 16 | 28 | 120 | ○ | ○ | ○ | ○ | ○ |
| 85 | 16 | 30 | 120 | ○ | X | ○ | X | X |
| 85 | 16 | 24 | 40 | ○ | X | ○ | ○ | X |
| 85 | 16 | 24 | 80 | ○ | ○ | ○ | ○ | ○ |
| 85 | 16 | 24 | 160 | ○ | ○ | ○ | ○ | ○ |

As apparent from Table 2, when thickness of the first dielectric film is changed variously in the range from 65 to 105 nm while optimizing thickness of the other films, Itop comes out of the standard range when the thickness is 65 nm below 75 nm, and modulation and 3T jitter come out of the standard ranges when the thickness is 105 nm larger than 95 nm. When the first dielectric film is 75 nm, 80 nm, 85 nm and 90 nm (75 to 90 nm), all characteristics come within the standard ranges. Therefore, thickness of the first dielectric film should be chosen from the range larger than 65 nm and smaller than 105 nm, and preferably from the range of 75 to 95 nm.

Still referring to Table 2, in case that thickness of the phase recording film is changed variously in the range of 10 to 22 nm while the first dielectric film is optimized to 80 nm or 85 nm, when the thickness is 10 nm below 12 nm, items other than resolution come out of the standard ranges. When thickness of the phase recording film is 22 nm, 3T jitter comes out of the standard range. When thickness of the first dielectric film is optimized to 80 nm and thickness of the phase recording film is changed to 12 nm, 16 nm and 20 nm, and the other thicknesses are optimized, all items come within the standard ranges. Therefore, thickness of the phase recording film should be selected from the range larger than 10 nm and smaller than 22 nm, and preferably from the range of 12 to 20 nm.

Still referring to Table 2, when the first dielectric film and the phase recording film are optimized in thickness to 85 nm and 16 nm, respectively, and thickness of the second dielectric film is changed variously in the range of 14 to 30 nm, modulation comes out of the standard range when thickness of the second dielectric film is 14 nm below 16 nm. When thickness of the second dielectric film is 30 nm larger than 28 nm, modulation, asymmetry and 3T jitter comes out of the standard ranges. When thickness of the second dielectric film is 16 nm, 24 nm and 28 nm, and the other thicknesses are optimized, all items come within the standard ranges. Therefore, thickness of he second dielectric film should be selected from the range larger than 14 nm and smaller than 30 nm, and preferably from the range of 16 to 28 nm.

Still referring to Table 2, when the first dielectric film, phase recording film and second dielectric film are optimized in thickness to 85 nm, 16 nm and 24 nm, respectively, and thickness of the reflection film is changed variously in the range of 40 to 160 nm, modulation and 3T jitter come out of the standard ranges when thickness of the reflection film is 40 nm below 80 nm. When thickness of the reflection film is 80 nm and 160 nm, values of all items come within the standard ranges. Therefore, thickness of the reflection film should be larger than 40 nm, and preferably selected from the range of 80 to 160 nm.

Next made was the third experiment regarding dependencies of signal characteristics of optical discs upon compositions of materials forming the phase recording film.

In the third experiment, the first dielectric film, phase film, second dielectric film and reflective are formed on each disc substrate, changing compositions of the phase recording films variously, to make up optical discs. After that, under two kinds of linear velocities for recording, namely, 3.6 m/s and 7.2 m/s, jitter characteristics were evaluated with these various optical discs. For both those two kinds of linear velocities, only when jitter characteristics were evaluated to be good, optical discs after recording were held for 100 hours in an atmosphere held at the temperature of 80° C. and humidity of 85%, and evaluation was carried out thereafter to confirm whether reproduction characteristics of these optical discs deteriorated, that is, whether they were acceptable in storage stability. The measurement/evaluation apparatus and recording densities of optical discs used in the third experiment were the same as those of the first experiment, and the recording strategy and the recording power were optimized.

Results of the third experiment are shown in Table 3 below. In the third experiment, measurement was carried out with various optical discs different in composition of the phase recording films. The range of numerical values under the item of jitter indicates the standard range. That is, in case of jitter, the range smaller than 15% is the standard range. When each evaluation result about jitter falls within the standard range, that is, in the range not higher than 15%, "○" is indicated, and if it is out of the standard range, i.e. in excess of 15%, "X" is indicated. Regarding storage stability, when it deteriorates, "X" is indicated, and when no deterioration or changes occurs, "○" is indicated.

TABLE 3

| Ge weight % | In weight % | Sb/Te — | Jitter (4X) <15% | Jitter (10X) <15% | Storage stability |
|---|---|---|---|---|---|
| 0 | 3 | 2.4 | ○ | ○ | X |
| 1 | 3 | 2.4 | ○ | ○ | ○ |
| 8 | 3 | 2.6 | ○ | ○ | ○ |
| 9 | 3 | 2.6 | X | X | — |
| 2 | 0 | 2.4 | X | X | — |
| 2 | 2 | 2.4 | ○ | ○ | ○ |

TABLE 3-continued

| Ge weight % | In weight % | Sb/Te — | Jitter (4X) <15% | Jitter (10X) <15% | Storage stability |
|---|---|---|---|---|---|
| 4 | 6 | 2.6 | ○ | ○ | ○ |
| 4 | 8 | 2.6 | X | ○ | — |
| 2 | 4 | 2 | ○ | X | — |
| 2 | 4 | 2.2 | ○ | ○ | ○ |
| 4 | 4 | 2.8 | ○ | ○ | ○ |
| 4 | 4 | 3.0 | ○ | ○ | ○ |
| 4 | 4 | 3.2 | X | ○ | — |

As apparent from Table 3, while the content (composition ratio) of Ge is changed variously in the range of 0 to 9 weight %, when the composition ratio of Ge is 0 weight %, that is, when the phase recording film does not contain Ge, storage stability is bad, and optical discs deteriorate. When the composition ratio of Ge is 9 weight % larger than 8 weight %, under any if the linear velocities 7.2 m/s and 3.6 m/s, jitter comes out of the standard range. When the composition ratio of Ge is changed to 1 weight %, 2 weight %, 4 weight % and 8 weight %, as far as the other composition ratios are optimized, all characteristics come within the standard ranges. Therefore, composition ratio of Ge should be selected from the range larger than 0 weight % and smaller than 9 weight %, and preferably from the range of 1 to 8 weight %.

Still referring to Table 3, when the composition ratio is optimized to 2 weight % or 4 weight %, and composition ratio of In is changed variously in the range of 0 to 8 weight %, jitter comes out of the standard range under any of the linear velocities 3.6 m/s and 7.2 m/s, when the composition ration of In is 0 weight %. When the composition ratio of In is 8 weight % larger than 6 weight %, jitter at the linear velocity of 3.6 m/s comes out of the standard range. In the case where the composition ratio of Ge is optimized to 2 weight % or 4 weight %, and composition ratio of In is changed to 2 weight %, 3 weight %, 4 weight % and 6 weight %, respectively, all items come within the standard ranges. Therefore, composition ratio of In should be selected from the range larger than 0 weight % and smaller than 8 weight %, and preferably from the range of 2 to 6 weight %.

Still referring to Table 3, when composition ratios of Ge and In are optimized to 2 weight % (or 4 weight %) and 4 weight %, and the ratio Sb/Te is changed variously in the range of 2 to 3.2, under the Sb/Te ratio of 2 smaller than 2.2, jitter at the linear velocity of 7.2 m/s comes out of the standard range. When the Sb/Te ratio is 3.2 larger than 3.0, jitter at the linear velocity of 3.6 m/s comes out of the standard range. In the case where composition ratios of Ge and In are optimized and the Sb/Te ratio is set to 2.2 and 3.0, evaluated values of all items come within the standard ranges. Therefore, Sb/Te ratio should be selected from the range larger than 2 and smaller than 3.2, and preferably from the range of 2.2 to 3.0.

Next made was the fourth experiment about dependencies of resistance to corrosion and signal characteristics of optical discs upon composition of the reflection film.

In the fourth experiment, the first dielectric film, phase recording film and second dielectric film were formed on each disc substrate. After that, reflection films with various composition ratios were stacked on the second dielectric films, thereby to obtain optical discs. Thereafter, jitter characteristics were evaluated with these various optical discs under the recording linear velocity of 3.6 m/s. Additionally, these optical discs were stored for 100 hours in an atmosphere held at the temperature of 80° C. and the humidity of 85%, and evaluation was carried out to confirm whether any corrosion occurred on surfaces of the reflection films, i.e., whether resistance to corrosion was good or not. The measurement/evaluation apparatus and recording densities of optical discs used in the fourth experiment were the same as those of the first experiment, and the recording strategy and the recording power were optimized.

Results of the fourth experiment are shown in Table 4 below. In the fourth experiment, optical discs variously changed in composition ratio of the AgPdCu alloy forming the reflection films were measured. The range of numerical values under the item of jitter indicates the standard range. That is, jitters not larger than 15% are within the standard range. When each evaluation result about jitters falls within the standard range, "○" is indicated, and if it is out of the standard range, i.e. in excess of 15%, "X" is indicated. Regarding resistance to corrosion, when there is corrosion, "X" is indicated, and when there is no corrosion, "○" is indicated.

TABLE 4

| Al weight % | Ag weight % | Pd weight % | Cu weight % | anti-corrosion | jitter (4X) <15% |
|---|---|---|---|---|---|
| — | 100 | — | — | x | ○ |
| — | balance | 0.5 | 1 | ○ | ○ |
| — | balance | 0.9 | 1 | ○ | ○ |
| — | balance | 1.5 | 1 | ○ | ○ |

As apparent from Table 4, only when the composition ratio of Ag is 100 weight %, corrosion occurs. Otherwise, whichever composition ratio the reflection film has, jitter comes within the standard range. That is, when Pd and Cu are added to Ag, corrosion does not occur, and resistance to corrosion is enhanced. Therefore, the reflection film should be made of an AgPdCu alloy, preferably having the composition ratio of Pd in the range of 0.5 to 1.5 weight %, and more preferably in the range of 0.9 to 1.5 weight %, and having the composition ratio of Cu in the range of 0.9 to 1.1 weight % near 1 weight %.

Next made was the fifth experiment about dependency of 3T jitter upon the recording power, and dependencies of modulation and resolution upon the recording power.

In the fifth experiment, similarly to the optical disc 1 according to the first embodiment, the 85 nm thick first dielectric film 3, 16 nm thick phase recording film 4, 22 nm thick second dielectric film 5 and 80 nm thick reflection film 6 were formed on each disc substrate 2 to make up optical discs 1. Then, information signals were recorded on the optical discs 1, changing the recording power variously in the range of 19 to 26 mW, dependency of 3T jitter upon the recording power and dependencies of modulation and resolution upon the recording power were evaluated. The measurement/evaluation apparatus and recording densities of optical discs used in the fifth experiment were the same as those of the first experiment, and the recording strategy and the recording power were optimized.

Figure 5A:
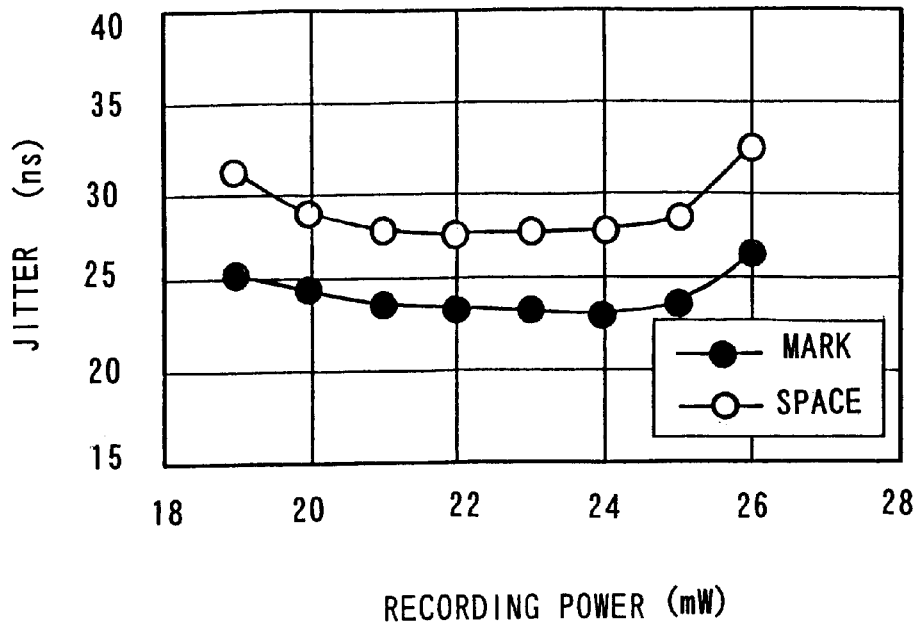
FIGS. 5A–5B is a graph that shows dependencies of 3T jitters, modulation factor and resolution of the optical disc according to the first embodiment of the invention upon the recording power.
Figure 5B:
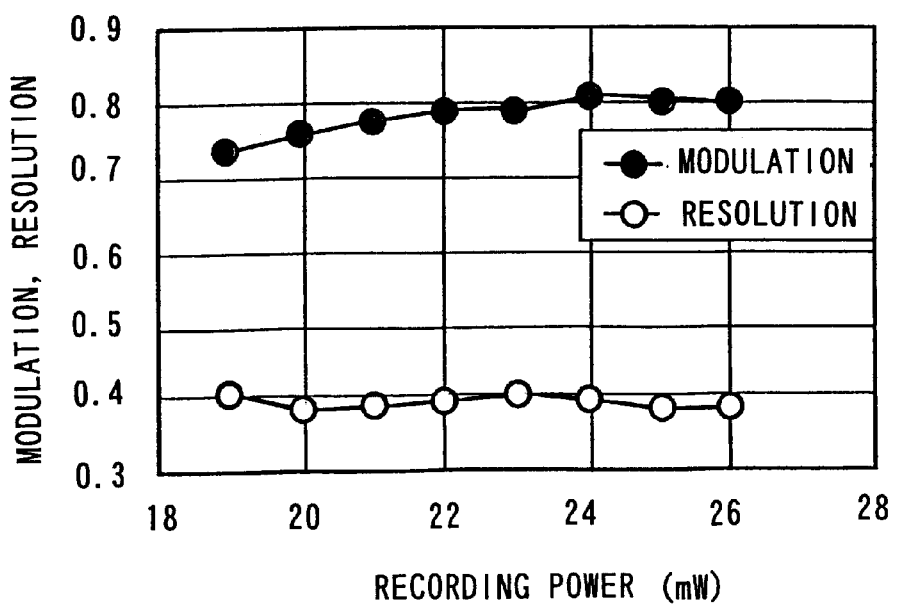

Results of the fifth experiment are shown in FIGS. 5A and 5B. FIG. 5A shows dependency of 3T jitter upon the recording power, and FIG. 5B shows dependencies of modulation and resolution upon the recording power. In FIG. 5A, 3T jitter values of both marks and spaces are shown. The value 35 ns on the jitter axis substantially corresponds to 15% of jitter. (1T=231 ns, 35/1T≈0.15=15%).

As apparent from FIG. 5A, when the recording power is in the range of 19 to 26 mW, 3T jitter at a mark is below 27 ns (about 11.6%), and 3T jitter at a space is below 33 ns (about 14.3%). Therefore, satisfactory recording characteristics should be obtained when the recording power is in the range from 19 to 26 mW.

As apparent from FIG. 5B, when the recording power is in the range from 19 to 26 mW, substantially no change occurs when resolution is near 0.4 (40%) larger than 0.2 (20%), and it will be possible to ensure satisfactory resolution characteristics. Modulation slightly increases within the range from 0.72 to 0.81, approximately, which is larger than 0.55 (55%), and this shows satisfactory modulation characteristics will be still obtained in that case.

From these results, optical discs according to the first embodiment were confirmed to be able to record and reproduce information in the high linear velocity range while maintaining sufficient recording characteristics.

As explained above, according to the first embodiment, the phase recording film 4 in the optical disc 1 is made of a GeInSbTe alloy material; the reflection film is made of an AgPdCu alloy material; the GeInSbTe alloy material forming the phase recording film 4 contains Ge in the range from 1 to 8 weight %, In in the range from 2 to 6 weight %, and Sb and Te adjusted to control Sb/Te within the range from 2.2 to 3.0 ; the AgPdCu alloy forming the reflection film 6 contains Pd in the range from 0.9 to 1.5 weight % and Cu in the range from 0.9 to 1.1 weight %; the groove 11 has a depth in the range from 35 nm to 45 nm; the groove 11 has a width in the range from 0.35 to 0.50 μm; thickness of the first dielectric film 3 is in the range from 75 to 95 nm; thickness of the phase recording film 4 is in the range from 12 to 20 nm; thickness of the second dielectric film 5 is in the range from 16 to 28 nm, and thickness of the reflection film 6 is in the range from 80 to 160 nm. Therefore, it is possible to perform recording and reproduction while maintaining characteristics equivalent to those of conventional optical discs even under a linear velocity in the range from 3.6 to 7.2 m/s, ensure satisfactory recording power margin and significantly increase the recording capacity, thereby to obtain an optical disc having a recording capacity around 1.3 GB, for example.

Next explained is an optical disc according to the second embodiment. In the optical disc according to the second embodiment, unlike the first embodiment, the reflection film 6 is made of an AlCu alloy. Content of Cu in the AlCu alloy is controlled in the range not higher than 1.5 weight %, and more specifically, to 1 weight %, for example. The other configuration of the optical disc according to the second embodiment is the same as the first embodiment, and its explanation is omitted here.

Using the optical disc according to the second embodiment, the sixth experiment was conducted about resistance to corrosion of the reflection film and dependency of signal characteristics upon composition of the reflection film.

In the sixth embodiment, similarly to the manufacturing method according to the first embodiment, the first dielectric film, phase recording film and second dielectric film were first formed on each disc substrate. Thereafter, reflection films made of AlCu alloys different in composition were stacked on the second dielectric films to make up optical discs. After that, with these various optical discs, jitter characteristics were evaluated. Further, these optical discs were stored for 100 hours in an atmosphere controlled at the temperature of 80° C. and the humidity of 85%, evaluation was made to confirm whether erosion occurred on surfaces of the reflection films, that is, whether the optical discs were good in resistance to corrosion. The measurement/ evaluation apparatus and recording densities of optical discs used in the sixth experiment were the same as those of the first experiment, and the recording strategy and the recording power were optimized.

Results of measurement by the sixth experiment are shown in Table 5 below. In the sixth experiment, measurement was conducted with optical discs changed variously in composition of the AlCu alloy forming the reflection films. The range of numerical values under the item of jitter indicates the standard range. That is, jitters not larger than 15% are within the standard range. When each evaluation result about jitters falls within the standard range, that is, in the range not higher than 10%, "◯" is indicated, and if it is out of the standard range, i.e. in excess of 15%, "X" is indicated. Regarding resistance to corrosion, when there is corrosion, "X" is indicated, and when there is no corrosion, "◯" is indicated.

TABLE 5

| Al weight % | Ag weight % | Pd weight % | Cu weight % | Anti-corrosion | Jitter (4X) <15% |
|---|---|---|---|---|---|
| Balance | — | — | 1 | ◯ | ◯ |
| Balance | — | — | 1.5 | ◯ | ◯ |
| Balance | — | — | 2 | ◯ | X |

As apparent from Table 5, when the content of Cu forming the reflection film is 2 weight %, jitter comes out of the standard range, and when the content is 1.5% and 1% below 2 weight %, jitter comes within the standard range. Further, regardless of the content of Cu, corrosion does not occur, and good resistance to corrosion is obtained. Therefore, the reflection film 6 according to the second embodiment should be made of an AlCu alloy containing Cu in the range not higher than 2 weight %, and preferably in the range not higher than 1.5 weight %.

The second embodiment, which is the same as the first embodiment except the reflection film 6 made of an AlCu alloy, ensures the same effects as those of the first embodiment.

For example, film deposition methods and materials of disc substrates and protective films proposed in the foregoing embodiments are not but mere examples, and different film deposition methods may be used, if necessary, and the disc substrate and the protective film may be made of other materials.

Although the first and second embodiments have been explained as using ZnS—$SiO_2$ mixture as the material of the first dielectric film and the second dielectric film, any other material may be used provided the extinction coefficient k is not larger than 0.3. More specifically, usable as materials of the first dielectric film and the second dielectric film are materials made of, or containing as a major component, nitrides, oxides, carbides, fluorides, sulfides, nitric oxides, nitric carbides or oxycarbides of metals or semi-metals like Al, Si, Ta, Ti, Zr, Nb, Mg, B, Zn, Pb, Ca, La, Ge, and so on. More specifically, usable as materials of the first dielectric film 3 and the second dielectric film 5 are $AlN_x$ ($0.5 \leq x \leq 1$, especially AlN), $Al_2O_{3-x}$ ($0 \leq x \leq 1$ (especially $Al_2O_3$)), $Si_3N_{4-x}$ ($0 \leq x \leq 1$ (especially $Si_3N_4$)), $SiO_x$ ($1 \leq x \leq 2$ (especially $SiO_2$, SiO), MgO, $Y_2O_3$, $MgAl_2O_4$, $TiO_x$ ($1 \leq x \leq 2$, (especially $TiO_2$)), $BaTiO_3$, $SrTiO_3$, $Ta_2O_{5-x}$ ($0 \leq x \leq 1$ (especially $Ta_2O_5$)), $GeO_x$ ($1 \leq x \leq 2$), SiC, ZnS, PbS, Ge—N, Ge—N—O, Si—N—O, $CaF_2$, LaF, $MgF_2$, NaF, $TiF_4$, and so on, or materials containing them as their major components, or mixtures of these materials, such as AlN—$SiO_2$, for example.

As explained above, according to the first aspect of the invention, the phase recording film is made of a GeInSbTe alloy material; the reflection film is made of an AgPdCu alloy material; the GeInSbTe alloy material forming the phase recording film contains Ge in the range from 1 weight % to 8 weight %, In in the range from 2 weight % to 6 weight %, and Sb in the range from 2.2 to 3.0 times of Te; the AgPdCu alloy material forming the reflection film contains Pd in the range from 0.9 weight % to 1.5 weight % and Cu in the range from 0.9 weight % to 1.1 weight %; groove depth in the groove track corrugation is in the range from 35 nm to 45 nm; distance between two boundaries, among boundaries between lands and grooves of the groove tracks, is in the range from 0.35 μm to 0.50 μm; thickness of the first dielectric film is in the range from 75 to 95 nm; thickness of the phase recording film is in the range from 12 to 20 nm; thickness of the second dielectric film is in the range from 16 to 28 nm, and thickness of the reflection film is in the range from 80 to 160 nm. Therefore, in case that NA is 0.55 upon recording, it is possible to ensure practical recording/ reproduction characteristics, prevent deterioration of jitter and decrease of modulation even at the linear velocity of 3.6 through 7.2 m/s, and obtain sufficient recording power margin. As a result, it is possible to obtain an optical recording medium ensuring practically sufficient recording/ reproducing properties.

According to the second aspect of the invention, the phase recording film is made of a GeInSbTe alloy material; the reflection film is made of an AlCu alloy material; the GeInSbTe alloy material forming the phase recording film contains Ge in the range from 1 weight % to 8 weight %, In in the range from 2 weight % to 6 weight %, and Sb in the range from 2.2 to 3.0 times of Te; the AlCu alloy material forming the reflection film contains Cu not exceeding 1.5 weight %; groove depth in the groove track corrugation is in the range from 35 nm to 45 nm; distance between two boundaries, among boundaries between lands and grooves of the groove tracks, is in the range from 0.35 μm to 0.50 μm; thickness of the first dielectric film 15 is in the range from 75 to 95 nm; thickness of the phase recording film is in the range from 12 to 20 nm; thickness of the second dielectric film is in the range from 16 to 28 nm, and thickness of the reflection film is in the range from 80 to 160 nm. Therefore, it is possible to ensure recording and reproduction characteristics based on the conventional standard, with NA during recording being 0.55, prevent jitter deterioration and decrease of the modulation therefore enable reproduction with reproduction-exclusive apparatuses in accordance with the conventional standard, prevent deterioration of jitter and decrease of modulation factor even at a linear velocity of 3.6 through 7.2 m/s, and thereby obtain a satisfactory recording power margin. As a result, it is possible to obtain an optical recording medium remarkably increased in recording capacity while ensuring practically sufficient recording/reproduction characteristics.

Having described specific preferred embodiments of the present invention with reference to the accompanying drawings, it is to be understood that the inventions is not limited to those precise embodiments, and that various changes and modifications may be effected therein by one skilled in the art without departing from the scope or the spirit of the invention as defined in the appended claims.

What is claimed is:

1. An optical recording medium having a substrate defining a corrugated and uneven groove track configuration on one major surface thereof; and a first dielectric film, a phase recording film, a second dielectric film and a reflection film which are sequentially stacked on said one major surface of said substrate, characterized in:

said phase recording film being made of a GeInSbTe alloy material, and said reflection film being made of a AgPdCu alloy material;

in said GeInSbTe alloy material forming said phase recording film, content of Ge being in the range from 1 weight % to 8 weight %, content of In being in the range from 2 weight % to 6 weight %, and ratio of Sb relative to Te being in the range of 2.2 times to 3.0 times, and in said AgPdCu alloy material forming said reflection film, content of Pd being in the range of 0.9 weight % to 1.5 weight %, and content of Cu being in the range of 0.9 weight % to 1.1 weight %, depth of each depression in said groove track configuration being in the range from 35 nm to 44 nm, distance between two adjacent boundaries at opposite sides of said depression among boundaries between crests and depressions being in the range of 0.35 μm to 0.50 μm, thickness of said first dielectric film being in the range of 75 nm to 95 nm, thickness of said phase recording film being in the range of 12 nm to 20 nm, thickness of said second dielectric film being in the range of 16 nm to 28 nm, and thickness of said reflection film being in the range of 80 nm to 160 nm.

2. The optical recording medium according to claim 1 wherein said distance between two adjacent boundaries at opposite sides of said depression is in the range from 0.40 μm to 0.50 μm.

3. The optical recording medium according to claim 1 wherein said ratio of Sb relative to Te is in the range from 2.2 times to 2.8 times.

4. The optical recording medium according to claim 1, configured to permit information signals to be recorded and/or erased thereon or therefrom by irradiating at least said phase recording film with light having a wavelength in the range from 775 nm to 795 nm.

5. The optical recording medium according to claim 1 wherein numerical aperture of a lens in an optical system used upon recording and/or erasing information signals on or from said optical recording medium is in the range from 0.54 to 0.56.

6. The optical recording medium according to claim 1 wherein the recording density thereof is about 0.44 μm per bit.

7. An optical recording medium having a substrate defining a corrugated and uneven groove track configuration on one major surface thereof; and a first dielectric film, a phase recording film, a second dielectric film and a reflection film which are sequentially stacked on said one major surface of said substrate, characterized in:

said phase recording film being made of a GeInSbTe alloy material, and said reflection film being made of a AlCu alloy material;

in said GeInSbTe alloy material forming said phase recording film, content of Ge being in the range from 1 weight % to 8 weight %, content of In being in the range from 2 weight % to 6 weight %, and ratio of Sb relative to Te being in the range of 2.2 times to 3.0 times, and in said AlCu alloy material forming said reflection film, content of Cu being not larger than 1.5 weight %, depth of each depression in said groove track configuration being in the range from 35 nm to 44 nm, distance between two adjacent boundaries at opposite sides of said depression among boundaries between crests and depressions being in the range of 0.35 μm to 0.50 μm, thickness of said first dielectric film being in the range of 75 nm to 95 nm, thickness of said phase recording film being in the range of 12 nm to 20 nm, thickness of said second dielectric film being in the range of 16 nm to 28 nm, and thickness of said reflection film being in the range of 80 nm to 160 nm.

8. The optical recording medium according to claim 7 wherein said distance between two adjacent boundaries at opposite sides of said depression is in the range from 0.40 μm to 0.50 μm.

9. The optical recording medium according to claim 7 wherein said ratio of Sb relative to Te is in the range from 2.2 times to 2.8 times.

10. The optical recording medium according to claim 7, configured to permit information signals to be recorded and/or erased thereon or therefrom by irradiating at least said phase recording film with light having a wavelength in the range from 775 nm to 795 nm.

11. The optical recording medium according to claim 7 wherein numerical aperture of a lens in an optical system used upon recording and/or erasing information signals on or from said optical recording medium is in the range from 0.54 to 0.56.

12. The optical recording medium according to claim 7 wherein the recording density thereof is about 0.44 μm per bit.

* * * * *